United States Patent
Garner

(10) Patent No.: US 9,794,883 B1
(45) Date of Patent: Oct. 17, 2017

(54) WIRELESS STREAMING SYSTEM WITH LOW POWER MODE AND ASSOCIATED REMOTE CONTROL

(71) Applicant: Roku, Inc., Saratoga, CA (US)

(72) Inventor: Greg Garner, Springdale, AR (US)

(73) Assignee: Roku, Inc., Los Gatos, CA (US)

( * ) Notice: Subject to any disclaimer, the term of this patent is extended or adjusted under 35 U.S.C. 154(b) by 130 days.

(21) Appl. No.: 14/582,132

(22) Filed: Dec. 23, 2014

(51) Int. Cl.
  *H04L 12/28* (2006.01)
  *H04W 52/02* (2009.01)
  *H04W 84/12* (2009.01)

(52) U.S. Cl.
  CPC ........ *H04W 52/0235* (2013.01); *H04W 84/12* (2013.01)

(58) Field of Classification Search
  CPC ...... H04L 12/12; G06F 1/3209; H04W 4/005; H04W 4/008; H04W 52/0229; H04W 52/0216
  See application file for complete search history.

(56) References Cited

U.S. PATENT DOCUMENTS

| 2004/0037300 A1* | 2/2004 | Lehr | G06F 1/26 370/401 |
| 2011/0090830 A1* | 4/2011 | Churei | G03G 15/5004 370/311 |
| 2013/0191663 A1* | 7/2013 | Overcash | G06F 1/3209 713/320 |
| 2014/0149758 A1* | 5/2014 | Rajkotia | H04L 12/12 713/310 |

* cited by examiner

*Primary Examiner* — Jamal Javaid
(74) *Attorney, Agent, or Firm* — Sterne, Kessler, Goldstein & Fox P.L.L.C.

(57) ABSTRACT

A wireless streaming system includes a wireless network interface circuit to receive streaming content from a wireless router. A processor is connected to the wireless network interface circuit. A memory is connected to the processor. The memory stores instructions executed by the processor to enter a sleep mode that periodically invokes a wireless interface chip off state and a wireless interface chip on state. The sleep mode is exited in response to the receipt of a wake packet observed during the wireless interface chip on state.

20 Claims, 5 Drawing Sheets

WIRELESS STREAMING SYSTEM WITH LOW POWER MODE AND ASSOCIATED REMOTE CONTROL

FIELD OF THE INVENTION

This invention relates generally to wireless streaming systems configured to consume internet content distributed by a wireless local area network. More particularly, this invention relates to a wireless streaming system with a low power mode and associated remote control.

BACKGROUND OF THE INVENTION

A wireless local area network (WLAN) is a wireless computer network that links two or more devices using a wireless distribution method within a limited area, such as a home, school or office building. A WLAN provides a connection to the wider Internet. Most modern WLANs are based on IEEE 802.11 standards and are marketed under the Wi-Fi brand name.

Wireless streaming systems are dedicated devices used to consume internet content distributed via a WLAN. Wireless streaming circuits may be configured as set top boxes, "sticks" that may be attached to a port of a television or circuits incorporated into televisions.

Wireless interface chips (e.g., Wi-Fi chips) consume relatively large amounts of power. This is not considered to be an issue while the chip is operative, but it does present challenges for the large amounts of time that the chips are not receiving content. There are ongoing demands to make all electronic devices more energy efficient.

In view of the foregoing, it would be desirable to provide a wireless streaming circuit with a low power mode that is operative with an associated remote control.

SUMMARY OF THE INVENTION

A wireless streaming system includes a wireless network interface circuit to receive streaming content from a wireless router. A processor is connected to the wireless network interface circuit. A memory is connected to the processor. The memory stores instructions executed by the processor to enter a sleep mode that periodically invokes a wireless interface chip off state and a wireless interface chip on state. The sleep mode is exited in response to the receipt of a wake packet observed during the wireless interface chip on state.

A remote control has a wireless interface circuit for communication with a wireless streaming system. A processor is connected to the wireless interface circuit. A memory is connected to the processor. The memory stores instructions executed by the processor to identify remote control input during a sleep state of the remote control, probe the wireless streaming system in response to the remote control input, identify a lack of response to the probe by the wireless streaming system, and broadcast a message to the wireless streaming system via the wireless interface circuit. The message is a wake packet.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
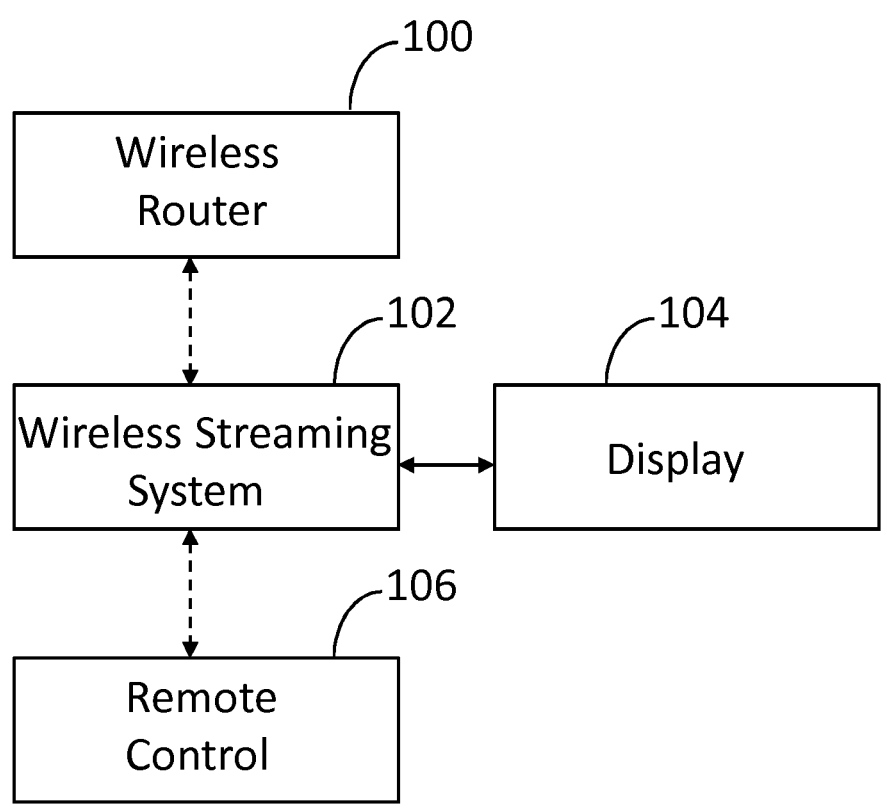
FIG. 1 illustrates a system configured in accordance with an embodiment of the invention.

FIG. 1 illustrates a system configured in accordance with an embodiment of the invention. A WLAN router 100 provides a wireless connection to the Internet. A WLAN streaming system 102 may be a client of the WLAN router 100. The WLAN streaming system 102 may be a standalone device (e.g., a set-top box or "stick" connectable to a television) or may be incorporated into a display 104 (e.g., a television and associated display). The WLAN streaming system 102 may be controlled by a remote control 106. The remote control 106 may be a dedicated device or it may be an application running on a smartphone, tablet or other larger computing platform.

Figure 2:
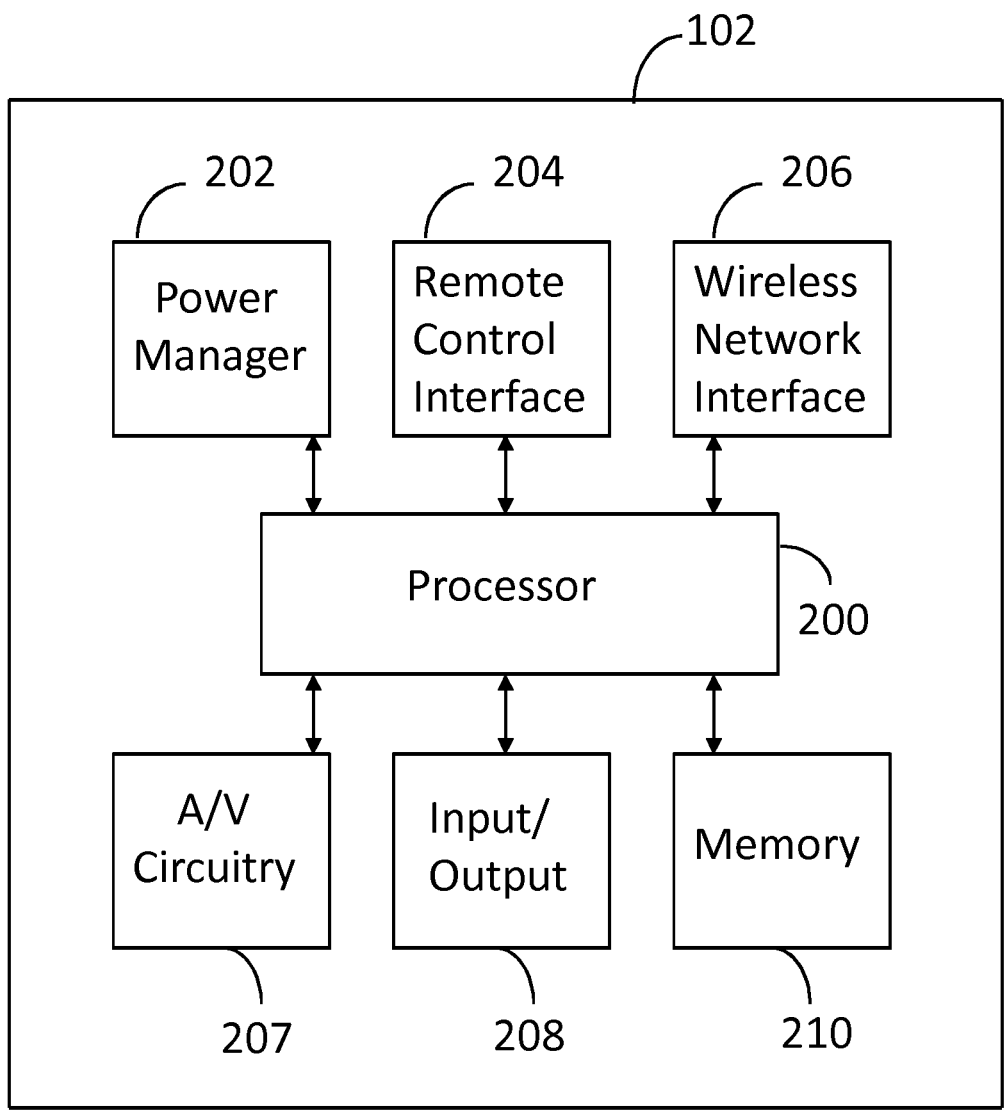
FIG. 2 illustrates wireless streaming system components associated with an embodiment of the invention.

FIG. 2 provides an example configuration for a wireless streaming system 102. The wireless streaming system 102 includes a processor 200, a power manager 202, a remote control interface 204 (e.g., a wireless interface to remote control 106) and a wireless network interface 206 (e.g., an interface to WLAN router 100 that utilizes a Wi-Fi chip). The wireless streaming system 102 may also include audio/visual circuitry 207 (e.g., to process content received from the WLAN router 100), input/output ports 208 (e.g., HDMI and other ports) and memory 210. Memory 210 stores instructions executed by the processor 200 to implement the processing discussed in connection with FIG. 3.

The processor 200 may utilize a central processing unit (CPU). In another embodiment, the processor 200 also utilizes a graphics processing unit (GPU), which may be integrated with the CPU or be configured to be physically separate. In one embodiment, the internal memory 210 includes one of or a combination of random access memory (RAM), flash memory and read only memory (ROM). Additional memory and memory interfaces may be provided in various embodiments to support memories such as external storage, which may include hard disks, Universal Serial Bus (USB) drives, Secure Digital (SD) cards, and the like. These memories may also be used for storage of applications, programs, buffered media, media, executable computer code, and software keys.

The remote control interface 204 enables an input device (e.g., a smartphone application or remote control) to apply commands to the wireless streaming system 102. In one embodiment, the remote control interface 204 is configured to communicate with the input device through a wireless interface such as radio frequency (RF) and infrared (IR). In one embodiment, the remote control interface 204 supports the functionality through an input device including any combination of virtual buttons embodied on a customization screen, physical buttons, accelerometer, gyroscope, pressure sensor, tilt sensor, magnetic sensor, microphone and light sensor.

In one embodiment, the input/output interface 208 supports multiple video output options such as HDMI, Red-Green-Blue (RGB) component video, Separate Video (S-video), Digital Visual Interface (DVI), Video Graphics Array (VGA), Mobile High-Definition Link (MHL) and composite video. In one embodiment, USB and Apple® Thunderbolt® ports are included.

In one embodiment, wireless network interface 206 supports multiple network interfaces such as Ethernet, Wi-Fi, and Bluetooth. In another embodiment, the wireless network interface 206 also supports coaxial, digital TV antenna and satellite television.

Figure 3:
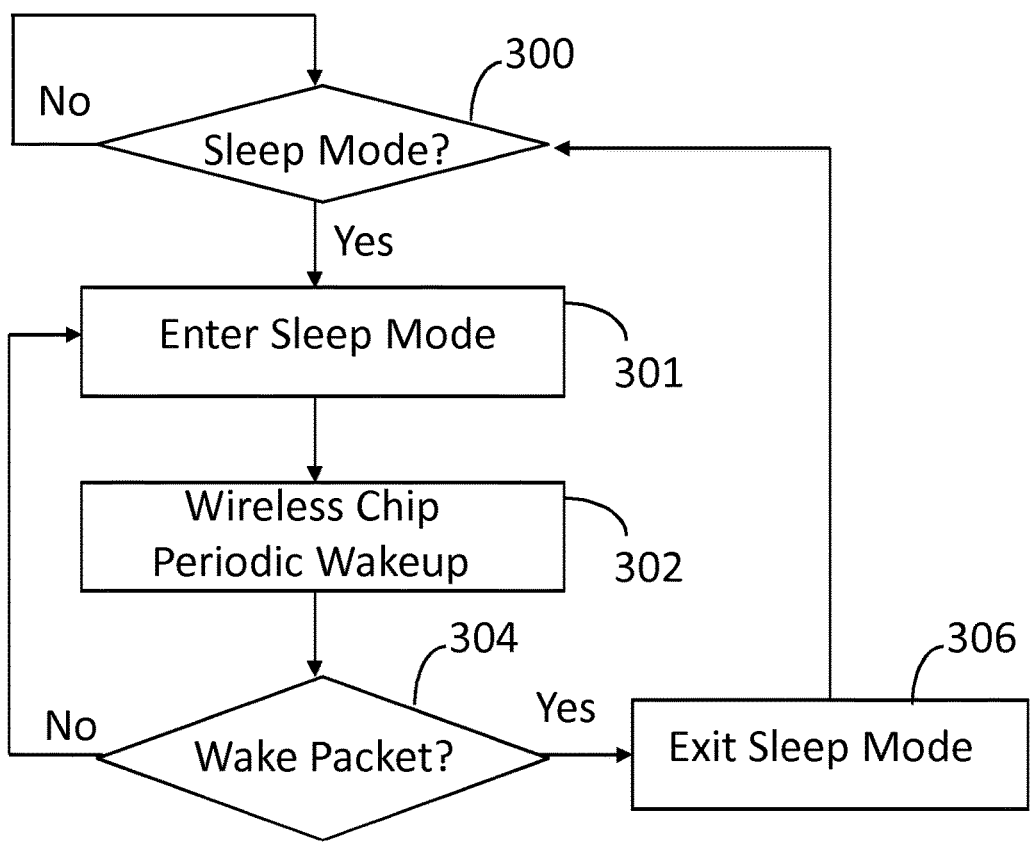
FIG. 3 illustrates processing operations associated with a wireless streaming system configured in accordance with an embodiment of the invention.

FIG. 3 illustrates processing operations performed by the wireless streaming system 102. In particular, the processor 200 under the control of instructions stored in memory 210 determines whether to enter sleep mode 200. Sleep mode may be entered in response to a sleep mode command relayed through the remote control interface 204. Alternately or in addition, sleep mode may be entered when streaming content is not being received and there is no input from the remote control interface 204 after a period of time exceeding a threshold. If sleep mode should not be entered (300—No), then the conditions for sleep mode are tested again. If sleep mode should be entered (300—Yes) then requisite operations are performed to enter the sleep mode 301. These operations include toggling the wireless interface chip into a wireless interface chip on state and a wireless interface chip off state to preserve power. The wireless interface chip may be a Wi-Fi chip incorporated into the wireless network interface 206. The wireless interface chip is periodically waked 302. In this wake state it searches for a wake packet 304. The wake packet is a transmitted instruction to exit the sleep mode. One type of wake packet is the "magic packet" defined by the Advanced Manageability Alliance, which introduced Wake-on-LAN (WoL) technology. WoL is an Ethernet computer network standard that allows a machine to be turned on by a network message. In the event of a machine being awakened via Wi-Fi, a standard called Wake on Wireless LAN (WoWLAN) is utilized. The magic packet is a broadcast frame containing anywhere within its payload 6 bytes of all 255 (FF FF FF FF FF FF in hexadecimal), followed by sixteen repetitions of the target machine's 48-bit MAC address, for a total of 102 bytes. The wake packet may be broadcast by the WLAN router 100 or the remote control 106. If the wake packet is present (304—Yes), sleep mode is exited 306. If the wake packet is not present (304—No), sleep mode is entered 301.

Figure 4:
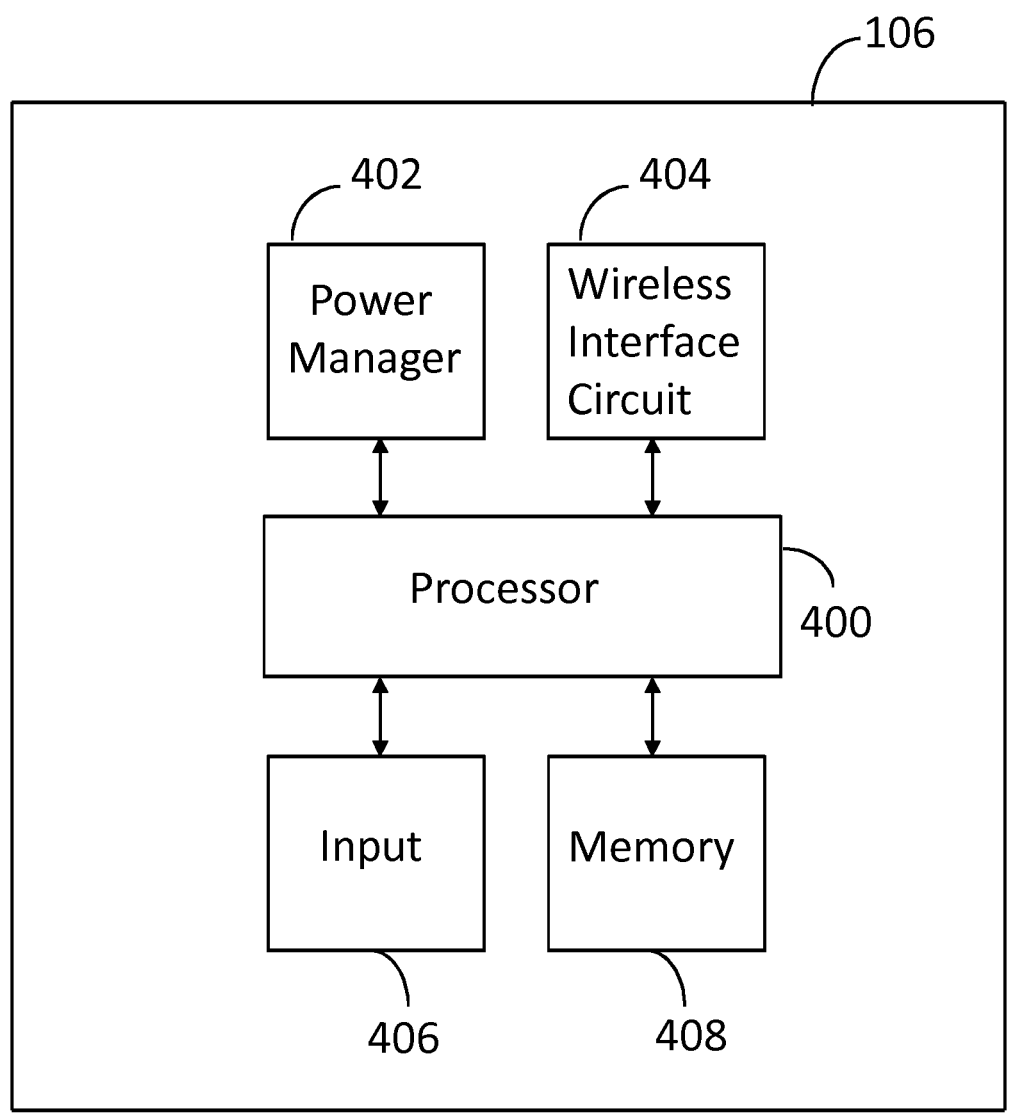
FIG. 4 illustrates a remote control configured in accordance with an embodiment of the invention.

FIG. 4 illustrates a remote control 106 configured in accordance with an embodiment of the invention. The remote control 106 includes a processor 400 and a power manager 402. The power manager 402 may be used to enter and exit a sleep mode associated with the remote control 106. The sleep mode may be entered if content is not being played by the associated wireless streaming system 102 and a key has not been pressed for a period of time exceeding a threshold. A wireless interface 404 operates as an interface with the wireless streaming system 102. Input 406 may be a keyboard, touch display and the like. Memory 408 includes instructions executed by the processor 400 to implement operations of the invention.

Figure 5:
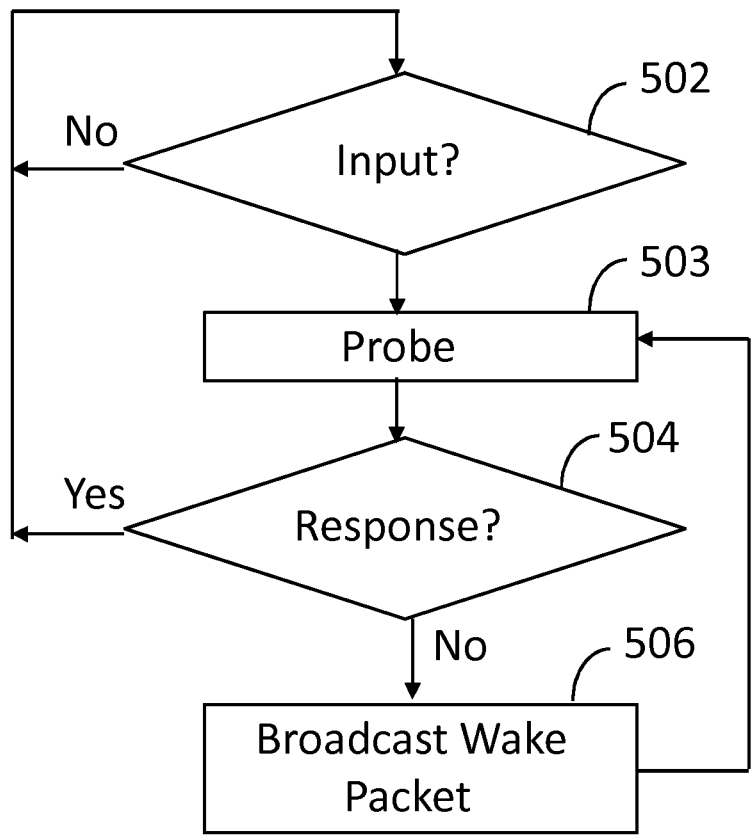
FIG. 5 illustrates processing operations associated with a remote control configured in accordance with an embodiment of the invention.

FIG. 5 illustrates an example of operations performed by the processor 400 under the control of instructions stored in memory 408. Processing in FIG. 5 is in the context of a sleep state of the remote control 106. That is, the remote control 106 is currently in a sleep state. The remote control 106 determines if there is input 502 to the remote control. The input may be in the form of a pressed button. In addition to checking for a pushed button the remote control 106 may check to determine if the accelerometer associated with the remote control 106 has generated a signal over a threshold. If not (502—No), the sleep state is maintained. If input is received (502—Yes), the remote control 106 sends a probe to the wireless streaming system 102 and waits for a response 504. If a response is received (504—Yes) then the wireless streaming system 102 is awake and normal operations are performed. If a response is not received (504—No) then the wireless streaming system 102 is not awake, but needs to be awakened because the user of the remote control desires action from the wireless streaming system 102. Therefore, a wake packet is broadcasted 506. A probe 503 is then sent 503. If a response is not received (504—No), another wake packet is broadcasted 506. This process may be repeated until the wireless streaming system 102 is responsive to a probe.

In sum, the disclosed techniques allow the wireless streaming system 102 to be woken from two different sources, either the remote 106 or the wireless router 100, each of which uses a wake packet. The difference between the two modes is as follows. WOWL Packets from the remote 106 to the wireless streaming system 102 are un-associated. The wireless streaming system 102 will only listen for the WOWL packet at specific times, not all the time. It is up to the remote to send the WOWL packet over and over again over a period of seconds to make sure that the wireless streaming system receives the packet while it is turned on. The only thing that is shared between the wireless streaming system and the remote in this case is the contents of the magic packet, and possibly the wireless streaming system and remote MAC addresses. Since the remote and the wireless streaming system are not associated, it means there is no encryption of the packet.

WOWL Packets from the wireless router 100 to the wireless streaming system 102 are associated, and therefore the wireless streaming system 102 knows the timeframe to expect the packet to arrive, as well as the specific address of the sender. The wireless streaming system wakes up and looks for the WOWL packet in the proper timeframe as agreed to between the wireless router 100 and the wireless streaming system 102 before the wireless streaming system 102 went to sleep. Since the wireless router 100 and the wireless streaming system 102 continue to be associated, the WOWL packets can be encrypted.

Observer that two wake packet modes are enabled at the same time, such that the wireless streaming system 102 can receive either the un-associated packet from the remote 106, or it can receive the associated packet from the wireless router 100.

An embodiment of the present invention relates to a computer storage product with a non-transitory computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media, optical media, magneto-optical media and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A wireless streaming system, comprising:
 a wireless network interface configured to receive streaming content from a wireless router; and
 a wireless interface chip connected to the wireless network interface, wherein the wireless interface chip is configured to:
  enter a sleep mode by invoking a wireless interface chip off state;
  periodically invoke a wireless interface chip on state;
  receive a wake packet during the wireless interface chip on state; and
  exit the sleep mode in response to receiving a wake packet during the wireless interface chip on state.

2. The wireless streaming system of claim 1, wherein the wake packet is sent from the wireless router or a remote control.

3. The wireless streaming system of claim 1, wherein the wireless interface chip is further configured to enter the sleep mode in response to a sleep mode command.

4. The wireless streaming system of claim 1, wherein the wireless interface chip is further configured to enter the sleep mode in response to an absence of activity for a period of time exceeding a threshold.

5. The wireless streaming system of claim 1, wherein the wake packet is a magic packet associated with a Wake on Wireless Local Area Network (WoWLAN) standard.

6. The wireless streaming system of claim 3, wherein the sleep mode command is received from a remote control via a radio frequency interface or an infrared interface.

7. The wireless streaming system of claim 4, wherein the absence of activity includes no streaming content received from the wireless router and no inputs received from a remote control.

8. The wireless streaming system of claim 2, wherein the wireless interface chip is further configured to:
 invoke the wireless interface chip on state in a timeframe specified between the wireless streaming system and the wireless router, wherein the wireless router sends the wake packet during the specified timeframe.

9. A method, comprising:
 receiving, by a wireless network interface, streaming content from a wireless router;
 entering, by a wireless interface chip connected to the wireless network interface, a sleep mode by invoking a wireless interface chip off state;
 periodically invoking a wireless interface chip on state;
 receiving a wake packet during the wireless interface chip on state; and
 exiting the sleep mode in response to receiving a wake packet during the wireless interface chip on state.

10. The method of claim 9, further comprising:
 receiving the wake packet from the wireless router or a remote control.

11. The method of claim 9, the entering further comprising:
 entering the sleep mode in response to receiving a sleep mode command.

12. The method of claim 9, the entering further comprising:
 detecting an absence of activity for a period of time exceeding a threshold; and
 entering the sleep mode in response to the detecting.

13. The method of claim 9, wherein the wake packet is a magic packet associated with a Wake on Wireless Local Area Network (WoWLAN) standard.

14. The method of claim 11, further comprising:
 receiving the sleep mode command from a remote control via a radio frequency interface or an infrared interface.

15. The method of claim 12, wherein the absence of activity includes no streaming content received from the wireless router and no inputs received from a remote control.

16. The method of claim 10, the periodically invoking comprising:
 invoking the wireless interface chip on state in a timeframe specified between the wireless streaming system and the wireless router, wherein the wireless router sends the wake packet during the specified timeframe.

17. A non-transitory computer-readable device having instructions stored thereon that, when executed by at least one computing device, causes the at least one computing device to perform operations comprising:
 receiving, by a wireless network interface, streaming content from a wireless router;
 entering, by a wireless interface chip connected to the wireless network interface, a sleep mode by invoking a wireless interface chip off state;
 periodically invoking a wireless interface chip on state;
 receiving a wake packet during the wireless interface chip on state; and
 exiting, by the wireless interface chip, the sleep mode in response to receiving a wake packet observed during the wireless interface chip on state.

18. The computer-readable device of claim 17, wherein the wake packet is received from the wireless router or a remote control.

19. The computer-readable device of claim 17, wherein to enter the sleep mode, the operations further comprise:
 detecting an absence of activity for a period of time exceeding a threshold; and
 entering the sleep mode in response to the detecting.

20. The computer-readable device of claim 19, wherein the absence of activity includes no streaming content received from the wireless router and no inputs received from a remote control.

* * * * *